June 18, 1963 R. ROSIER 3,094,580
AFOCAL OPTICAL SYSTEM FOCAL LENGTH CHANGER
Filed Aug. 3, 1960

United States Patent Office 3,094,580
Patented June 18, 1963

3,094,580
AFOCAL OPTICAL SYSTEM FOCAL LENGTH
CHANGER
Raymond Rosier, Asnieres, France, assignor to Societe d'Optique et de Mecanique de Haute Precision, Paris, France, a French company
Filed Aug. 3, 1960, Ser. No. 47,165
Claims priority, application France Aug. 6, 1959
1 Claim. (Cl. 88—57)

This invention relates to an optical combination included in the class of the "afocal systems."

It is known that in such systems the focus, instead of being positioned at a finite distance as in conventional lenses, are cast to the infinite.

The advantage of this disposition results from the fact that it permits in particular, when the afocal system is fitted in front of a conventional lens adjusted to infinity, to change the focal length that is to say, in short the magnitude of the image without altering its position: in this way the setting of a lens on a camera with standard mechanical print or an ordinary camera is not adversely affected by addition of the afocal system.

Of course in the case of a short shot the adjustment should be controlled in taking into account the presence of the additional system; this can be readily obtained for example in keeping the lens set on infinity and adjusting the proper setting of the additional system (by spacing of its elements).

According to the invention the afocal optical system includes two elements the first one thereof comprising two concentric spherical faces and back surfaces, the second element comprising one spherical face surface concentric to the surfaces of the first element and a plane rear surface.

The annexed drawing shows diagrammatically an afocal system according to the invention.

Figure 1:
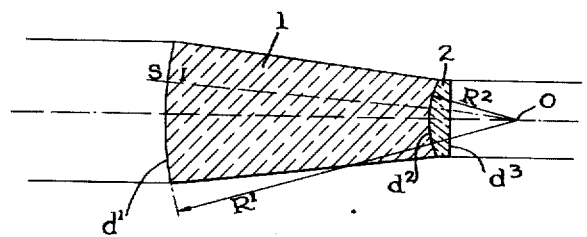
Figure 2:
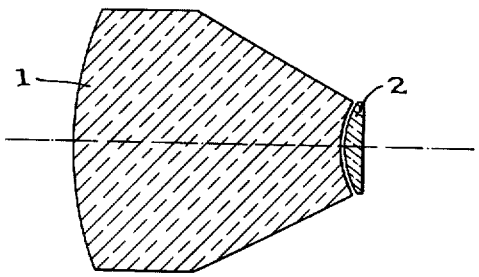
Figure 3:
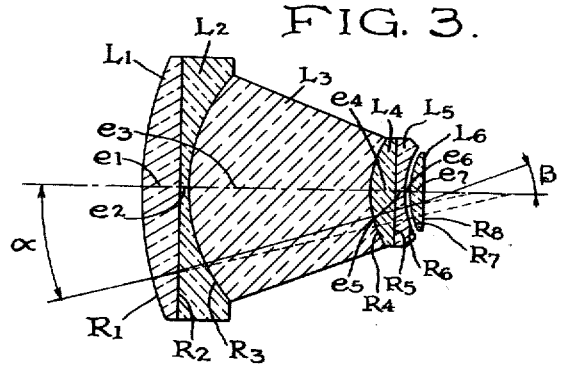

On said drawing:
FIG. 1 is a basic diagram;
FIG. 2 is a diagram showing the two separate elements of the afocal system;
FIG. 3 is a diagram showing a special embodiment of the afocal system.

The diagram of FIG. 1 shows the afocal system comprising two elements 1 and 2, the radii $R_1$ and $R_2$ of the front surface $d_1$ and middle surface $d_2$ having a common centre C while the rear surface $d_3$ is plane; the surface $d_2$ projects the image to infinity.

The following advantages result from the general structure disclosed above:

(a) The aberrations which affect the luminous beams oblique on the axis are the same as the ones affecting the beams parallel to the optical axis. In fact the secondary axis of the first such as SI of FIG. 1 cross normally, that is to say without refraction, the front surface $d_1$ and middle surface $d_2$ of the additional system, which suppresses, for these surfaces, any astigmatism, coma or chromatism defect. In other words, the common centre of curvature is situated in the centre of a pupil. On the other hand, the image from the middle surface $d_2$ being projected to the infinity, the refraction through the terminal plane surface $d_3$ introduces no new aberration.

Consequently, the only defect to be considered is the spherical aberration. In the hereafter disclosed embodiment this defect would be over-corrected should no corrective steps be taken.

In order to suppress this aberration exactly the terminal lens 2 should be detached from the front lens 1 (FIG. 2), but the air gap which then separates the two lenses must, in compliance with the general principle of the invention, have its surfaces concentric and of same centre as that of the front surface.

(b) The systematic use of concentric surfaces on conventional lenses is of course known; but if in these lenses, the external or internal surface limiting the lenses is correctly centered at the same point the center-image proper also has this same center of curvature and therefore is strongly curved, so much so, that a sensitive surface is used having a spherical form, centred on the common center of curvature.

In fact, in an ordinary objective the final focal length the structure which is based on the concentricity principle of the surfaces, the image-field is "applied" on a sphere having for its centre the common center of curvature and for its radius the distance from this point to the image-focus. In this case the common center of curvature is the optical center and the objective symmetry center.

In the afocal combination of the present invention, the object-focus and image being projected to the infinity, the radius of the image-sphere reaches an infinite value. This means that the image-field is flat. Consequently the afocal system could be mounted in front of a lens without increasing the proper aberrations of said lens.

(c) In order to correct the physical aberrations (chromatism) it is sufficient, according to a known process, to divide certain (or all) simple lenses which constitute the afocal device into two or more lenses having the same basic index as the simple lens so that the previous correction of the geometric aberrations may not be affected but given dispersion powers or with distinct "V" and properly selected. In such case, of course, the power resulting from the constituents should be substantially equal to the lens power before division.

The description which follows of the embodiment of the accompanying drawing, which is shown only as an example and not as a limitation, will show how the invention can be achieved, the particularities that merge from the drawing and from the text as well being, of course an integral part of the invention.

According to a general standard the direction in which the successive elements of the afocal system are encountered is that of the incident propagation of light, assumed to move from left to right in the drawing. This is also the adopted positive direction.

The basic indexes (for helium line) of the glasses making up the afocal system elements, satisfy the inequality:

$$n > n'$$

where $n$ is the refraction index of the front lens, $n'$ the refraction index of the next lens in the basic diagram of FIG. 1.

The concentricity of the surfaces of the afocal combination may be expressed in terms of the thickness $e$ of the first lens, its front radius R and the indexes $n$ and $n'$:

$$e = \frac{n(n'-1)}{n'(n-1)} R$$

As regards the magnification of the system, an elementary calculation shows that it is simply expressed by $n'$.

The numeral data of the embodiment which follows were determined with regard to the above, by the requirements of the spherical and chromatic corrections and by economy.

In the basic diagram of FIG. 1, the thickness of the first lens, being due to the concentricity of its radii of curvature $R_1$ and $R_2$ is equal to their difference. This part is comparatively thick (if the radii $R_1$ and $R_2$ are almost equal the second lens would be the thicker of the two).

Either lens thus represents a considerable amount of material and there is advantage in production not to cut them from a glass as costly glass having the basic index type $n=1.8$ and for $v=45.5$ for index required with a high value to satisfy the $n>n'$ condition.

Consequently the costly material has been used for the first and for the fifth lens, $L_1$ and $L_5$, both being relatively thin (FIG. 3).

It is necessary to chromatize and this function is provided by the assembly of connected lenses $L_2$, $L_3$, $L_4$ which constitute a plate with flat and parallel faces for a given radiation. These three elements are made up of glasses having the same basic index (1.62025) for the helium line $d$ but with distinct dispersions. Thus if the lens $L_3$ is comparatively bulky it is at least made of a much less costly material than the lens with a high index.

An additional advantage is provided by the following fact: this glass is substantially clearer which is all the more interesting as the element is thicker.

The data (radius of curvature, thicknesses and spacings) for the lenses of the combination of the example, were determined while taking into account the structural modifications made to the basic diagram for correction of aberrations due to the necessity for making the system afocal. Consequently, the basic radiation, an oblique inclined pupillary ray at angle $\alpha$ to the optical axis (FIG. 3) and normal to the first surface of the system, refracts by crossing the second surface, crosses without deviation the third and fourth surfaces and comes out of the fifth surface in a parallel direction to that of incidence and directed towards the center common to the sixth and seventh surfaces and forms at emergence from the eighth surface an angle $\beta$ the sinus thereof being equal to the angle $\alpha$ sinus multiplied by the refraction index $n'$ (which is also, as already mentioned, the magnifying value).

The afocal system so defined is designed for mounting on the front of a camera lens opened at 1:2.8, with a nominal focal length of 50 mm. for the 24 x 36 mm. size. The resulting combination constitutes an objective of a focal length of about 75 mm. Naturally the lens working lengths have been amply designed to allow for a free passage of the pupillary beam coaxially to a full opening in order not to reduce the comparative opening of the complete combination and to avoid any troublesome diaphragmation of the oblique beams cooperating with forming and illuminance of the margin areas of the total field.

It is to be understood that any embodiment designed for applying this device to another size of camera lens or on a visual instrument having an optical formula, with different numeral data but complying with the general conditions stated above is included within the scope of the present invention.

|  | Radii of curvature | Thicknesses or distances | $n_d$ | $v$ |
| --- | --- | --- | --- | --- |
| Lens 1 | $R_1=+70$ | $e_1=7$ | 1.8 | 45.5 |
| Lens 2 | $R_2=\infty$ | $e_2=2$ | 1.62025 | 36.2 |
| Lens 3 | $R_3=+33$ | $e_3=34.964$ | 1.62025 | 60.2 |
| Lens 4 | $R_4=+20$ | $e_4=4$ | 1.62025 | 36.2 |
| Lens 5 | $R_5=\infty$ | $e_5=2$ | 1.8 | 45.5 |
|  | $R_6=+15.49$ | $e_6=0.54$ |  |  |
| Lens 6 | $R_7=14.95$ | $e_7=3$ | 1.50050 | 60.7 |
|  | $R_8=\infty$ |  |  |  | where $n_d$ is the index of refraction and $v$ is the dispersive power of the glass of the lenses.

What I claim is:

In an afocal optical lens system, a focal length changer having six lens elements including a lens unit formed by five of said lens elements having two concentric spherical surfaces, one front and one rear, the sixth lens element being separated from said lens unit by an air space and comprising one front spherical surface concentric to the surfaces of said lens unit and a plane rear surface, said lens unit including two thin terminal lens elements in contact over adjacent parallel plane surfaces, the lens system being substantially in accordance with the following table:

| Radii of curvature | Thicknesses or distances | $n_d$ | $v$ |
| --- | --- | --- | --- |
| $R_1=+70$ | $e_1=7$ | 1.8 | 45.5 |
| $R_2=\infty$ | $e_2=2$ | 1.62025 | 36.2 |
| $R_3=+33$ | $e_3=34.964$ | 1.62025 | 60.2 |
| $R_4=+20$ | $e_4=4$ | 1.62025 | 36.2 |
| $R_5=\infty$ | $e_5=2$ | 1.8 | 45.5 |
| $R_6=+15.49$ | $e_6=0.54$ |  |  |
| $R_7=14.95$ | $e_7=3$ | 1.50050 | 60.7 |
| $R_8=\infty$ |  |  |  | wherein R is the radius of a spherical surface of a lens element, $e$ indicates the thickness of an element of the system and the thickness of an air space measured along the axis of the system, $n_d$ is the index of refraction of a lens element and $v$ is the dispersive power of the glass of the lenses, all the dimensions being measured in like linear units.

References Cited in the file of this patent

UNITED STATES PATENTS

| 874,049 | Borsch | Dec. 17, 1907 |
| 2,522,390 | McCarthy | Sept. 12, 1950 |
| 2,785,604 | Blaisse et al. | Mar. 19, 1957 |

UNITED STATES PATENT OFFICE

CERTIFICATE OF CORRECTION

Patent No. 3,094,580                                        June 18, 1963

Raymond Rosier

It is hereby certified that error appears in the above numbered patent requiring correction and that the said Letters Patent should read as corrected below.

Column 1, line 46, for "centre C" read -- centre O --.

Signed and sealed this 31st day of December 1963.

(SEAL)                                                        EDWIN L. REYNOLDS
Attest:
ERNEST W. SWIDER Attesting Officer                                    Acting     Commissioner of Patents